US011801863B2

(12) United States Patent
Oniwa

(10) Patent No.: US 11,801,863 B2
(45) Date of Patent: Oct. 31, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yoshihiro Oniwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 17/500,992

(22) Filed: Oct. 14, 2021

(65) Prior Publication Data
US 2022/0194416 A1    Jun. 23, 2022

(30) Foreign Application Priority Data
Dec. 17, 2020    (JP) .................................. 2020-209231

(51) Int. Cl.
*B60W 60/00* (2020.01)
*B60W 50/08* (2020.01)
(Continued)

(52) U.S. Cl.
CPC .......... *B60W 60/001* (2020.02); *B60W 10/20* (2013.01); *B60W 40/105* (2013.01);
(Continued)

(58) Field of Classification Search
CPC .. B60W 60/001; B60W 10/20; B60W 40/105; B60W 50/0205; B60W 50/029;
(Continued)

(56) References Cited

U.S. PATENT DOCUMENTS 6,487,501 B1 * 11/2002 Jeon ..................... B62D 15/025
702/167
2012/0283907 A1 * 11/2012 Lee ..................... B60T 8/17557
701/32.9
(Continued)

FOREIGN PATENT DOCUMENTS

JP    63-114303    7/1988
JP    2002-331952    11/2002
(Continued)

OTHER PUBLICATIONS

Japanese Office Action for Japanese Patent Application No. 2020-209231 dated Sep. 6, 2022.

*Primary Examiner* — Sze-Hon Kong
(74) *Attorney, Agent, or Firm* — AMIN, TUROCY & WATSON, LLP

(57) ABSTRACT

Provided is a vehicle control device configured to: generate a target trajectory of a vehicle; and determine whether change in speed of a target steering angle in a first period is equal to or larger than a first threshold value and whether change in speed of the target steering angle in a second period is equal to or larger than a second threshold value; and change, in a case where the driving mode of the vehicle is a second driving mode, the driving mode of the vehicle to a first driving mode when the change in speed of the target steering angle in the first period is determined to be equal to or larger than the first threshold value or when the change in speed of the target steering angle in the second period is determined to be equal to or larger than the second threshold value.

10 Claims, 5 Drawing Sheets

(51) Int. Cl.
  *B60W 50/029* (2012.01)
  *B60W 50/02* (2012.01)
  *B60W 10/20* (2006.01)
  *B60W 40/105* (2012.01)
  *B60W 50/00* (2006.01)

(52) U.S. Cl.
  CPC ...... *B60W 50/0205* (2013.01); *B60W 50/029* (2013.01); *B60W 50/082* (2013.01); *B60W 60/005* (2020.02); *B60W 2050/0021* (2013.01); *B60W 2050/0054* (2013.01); *B60W 2510/205* (2013.01); *B60W 2540/18* (2013.01)

(58) Field of Classification Search
  CPC ............ B60W 50/082; B60W 60/005; B60W 2050/0021; B60W 2050/0054; B60W 2510/205; B60W 2540/18; B60W 2540/22; B60W 30/182; B60K 2370/167; B60K 2370/172; B60K 2370/175; B60K 35/00; B60K 2370/1868; B60Y 2302/09
  See application file for complete search history.

(56) References Cited

U.S. PATENT DOCUMENTS

| | | | |
|---|---|---|---|
| 2013/0253767 A1* | 9/2013 | Lee | B60W 50/04 701/41 |
| 2013/0253793 A1* | 9/2013 | Lee | B60W 50/029 701/70 |
| 2015/0314803 A1* | 11/2015 | Kojo | B60T 8/1755 701/43 |
| 2018/0023951 A1 | 1/2018 | Seo et al. | |
| 2018/0196444 A1* | 7/2018 | Yi | B60W 30/10 |
| 2021/0097786 A1* | 4/2021 | LaBarbera | G07C 5/0808 |
| 2022/0185327 A1* | 6/2022 | Do | B60W 30/09 |
| 2022/0297754 A1* | 9/2022 | Benmokhtar | B62D 15/025 |
| 2023/0054024 A1* | 2/2023 | Oba | A61B 5/18 |
| 2023/0087332 A1* | 3/2023 | Dieckmann | B60W 10/184 701/70 |

FOREIGN PATENT DOCUMENTS

| | | |
|---|---|---|
| JP | 2017-202773 | 11/2017 |
| JP | 2018-511505 | 4/2018 |
| JP | 2018-144557 | 9/2018 |
| WO | 2016/071478 | 5/2016 |

* cited by examiner

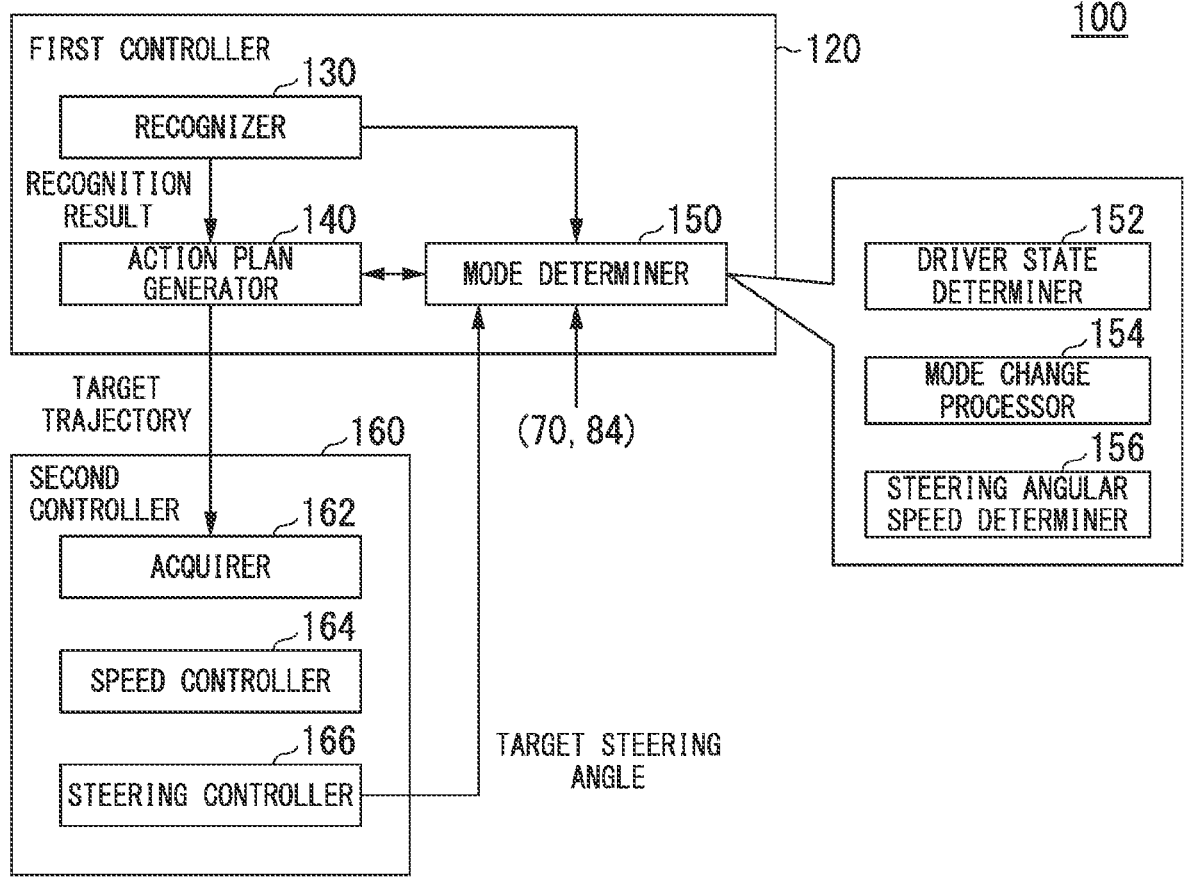

VEHICLE CONTROL DEVICE, VEHICLE CONTROL METHOD, AND STORAGE MEDIUM

CROSS-REFERENCE TO RELATED APPLICATION

The application is based on Japanese Patent Application No. 2020-209231 filed on Dec. 17, 2020, the content of which incorporated herein by reference.

BACKGROUND

Field of the Invention

The present invention relates to a vehicle control device, a vehicle control method, and a storage medium.

Description of Related Art

The technology of detecting an abnormality in steering of a vehicle and preventing an accident is known. For example, Utility Model Application Laid-Open No. Sho 63-114303 discloses a steering control device configured to detect a steering angle of a vehicle and determine that an abnormality in steering has occurred when the steering angle is equal to or larger than a threshold value.

SUMMARY

However, the steering control device disclosed in Utility Model Application Laid-Open No. Sho 63-114303 determines an abnormality in steering based on the steering angle of a vehicle, and does not consider other parameters. Furthermore, the steering control device disclosed in Utility Model Application Laid-Open No. Sho 63-114303 determines an abnormality in steering by using one threshold value, resulting in a problem in that the reliability of determination is low.

The present invention has been made in view of such circumstances, and has an object to provide a vehicle control device, a vehicle control method, and a storage medium, which are capable of determining an abnormality in steering of a vehicle more reliably.

A vehicle control device according to the present invention adopts the following configuration.

(1): A vehicle control device according to one aspect of the present invention includes one or more storage devices storing a program; and one or more hardware processors, the one or more hardware processors being configured to execute the program stored in the one or more storage devices to: generate a target trajectory of a vehicle; determine whether or not a change in speed of a target steering angle for following the target trajectory in a first period is equal to or larger than a first threshold value and whether or not a change in speed of the target steering angle in a second period is equal to or larger than a second threshold value; and determine a driving mode of the vehicle as any one of a plurality of driving modes including a first driving mode and a second driving mode that imposes a simpler task on a driver than the first driving mode, wherein the one or more hardware processors are configured to change, in a case where the driving mode of the vehicle is the second driving mode, the driving mode of the vehicle to the first driving mode when the change in speed of the target steering angle in the first period is determined to be equal to or larger than the first threshold value or when the change in speed of the target steering angle in the second period is determined to be equal to or larger than the second threshold value, wherein the first period is a period longer than the second period, and wherein the first threshold value is a value smaller than the second threshold value.

(2): A vehicle control device according to another aspect of the present invention includes one or more storage devices storing a program; and one or more hardware processors, the one or more hardware processors being configured to execute the program stored in the one or more storage devices to: generate a target trajectory of a vehicle; determine whether or not a change in speed of a target steering angle for following the target trajectory in a first period is equal to or larger than a first threshold value and whether or not a change in speed of the target steering angle in a second period is equal to or larger than a second threshold value; and determine a driving mode of the vehicle as any one of a plurality of driving modes including a first driving mode and a second driving mode that imposes a simpler task on a driver than the first driving mode, wherein the one or more hardware processors are configured to change, in a case where the driving mode of the vehicle is the second driving mode, the driving mode of the vehicle to the first driving mode when the change in speed of the target steering angle in the first period is determined to be equal to or larger than the first threshold value and the change in speed of the target steering angle in the second period is determined to be equal to or larger than the second threshold value, wherein the first period is a period longer than the second period, and wherein the first threshold value is a value smaller than the second threshold value.

(3): In the aspect (1), the one or more hardware processors are configured to set the first threshold value or the second threshold value smaller as a vehicle speed of the vehicle becomes higher.

(4): In the aspect (1), the one or more hardware processors are configured to set the first threshold value or the second threshold value to a predetermined value when a vehicle speed of the vehicle falls within a range of from zero to a reference vehicle speed.

(5): In the aspect (4), the second driving mode includes a driving mode that does not impose any one of a task of monitoring a front field of the vehicle and a task of grasping a steering wheel of the vehicle and in which an upper limit vehicle speed is set for the vehicle, and the reference vehicle speed is the upper limit vehicle speed.

(6): In the aspect (1), the one or more hardware processors are configured to set the first threshold value or the second threshold value larger when a steering direction of the vehicle is a steering-backward direction than when the steering direction is a steering-forward direction.

(7): A vehicle control method according to one aspect of the present invention is a vehicle control method to be executed by a vehicle control device, the vehicle control method including: acquiring a target steering angle for following a target trajectory of a vehicle; determining whether or not a change in speed of the target steering angle in a first period is equal to or larger than a first threshold value and whether or not a change in speed of the target steering angle in a second period is equal to or larger than a second threshold value; determining a driving mode of the vehicle as any one of a plurality of driving modes including a first driving mode and a second driving mode that imposes a simpler task on a driver than the first driving mode; and changing, in a case where the driving mode of the vehicle is the second driving mode, the driving mode of the vehicle to the first driving mode when the change in speed of the target steering angle in the first period is determined to be equal to or larger than the first threshold value or when the change in speed of the target steering angle in the second period is determined to be equal to or larger than the second threshold value, wherein the first period is a period longer than the second period, and wherein the first threshold value is a value smaller than the second threshold value.

(8): A vehicle control method according to one aspect of the present invention is a vehicle control method to be executed by a vehicle control device, the vehicle control method including: acquiring a target steering angle for following a target trajectory of a vehicle; determining whether or not a change in speed of the target steering angle in a first period is equal to or larger than a first threshold value and whether or not a change in speed of the target steering angle in a second period is equal to or larger than a second threshold value; determining a driving mode of the vehicle as any one of a plurality of driving modes including a first driving mode and a second driving mode that imposes a simpler task on a driver than the first driving mode; and changing, in a case where the driving mode of the vehicle is the second driving mode, the driving mode of the vehicle to the first driving mode when the change in speed of the target steering angle in the first period is determined to be equal to or larger than the first threshold value and the change in speed of the target steering angle in the second period is determined to be equal to or larger than the second threshold value, wherein the first period is a period longer than the second period, and wherein the first threshold value is a value smaller than the second threshold value.

(9): A computer-readable non-transitory storage medium according to one aspect of the present invention stores a program for causing a processor of a vehicle control device to: acquire a target steering angle for following a target trajectory of a vehicle; determine whether or not a change in speed of the target steering angle in a first period is equal to or larger than a first threshold value and whether or not a change in speed of the target steering angle in a second period is equal to or larger than a second threshold value; determine a driving mode of the vehicle as any one of a plurality of driving modes including a first driving mode and a second driving mode that imposes a simpler task on a driver than the first driving mode; and change, in a case where the driving mode of the vehicle is the second driving mode, the driving mode of the vehicle to the first driving mode when the change in speed of the target steering angle in the first period is determined to be equal to or larger than the first threshold value or when the change in speed of the target steering angle in the second period is determined to be equal to or larger than the second threshold value, wherein the first period is a period longer than the second period, and wherein the first threshold value is a value smaller than the second threshold value.

(10): A computer-readable non-transitory storage medium according to one aspect of the present invention stores a program for causing a processor of a vehicle control device to: acquire a target steering angle for following a target trajectory of a vehicle; determine whether or not a change in speed of the target steering angle in a first period is equal to or larger than a first threshold value and whether or not a change in speed of the target steering angle in a second period is equal to or larger than a second threshold value; determine a driving mode of the vehicle as any one of a plurality of driving modes including a first driving mode and a second driving mode that imposes a simpler task on a driver than the first driving mode; and change, in a case where the driving mode of the vehicle is the second driving mode, the driving mode of the vehicle to the first driving mode when the change in speed of the target steering angle in the first period is determined to be equal to or larger than the first threshold value and the change in speed of the target steering angle in the second period is determined to be equal to or larger than the second threshold value, wherein the first period is a period longer than the second period, and wherein the first threshold value is a value smaller than the second threshold value.

According to the aspects (1), (6), and (8), it is possible to determine an abnormality in steering of a vehicle more reliably.

According to the aspects (2), (7), and (9), it is possible to prevent erroneous determination of an abnormality in steering of a vehicle.

According to the aspects (3) and (4), it is possible to control the driving mode safely for the user.

According to the aspect (5), it is possible to control the driving mode flexibly depending on a steering angle.

BRIEF DESCRIPTION OF THE DRAWINGS

FIG. 2 is a configuration diagram of a vehicle system that uses a vehicle control device according to an embodiment.

FIG. 3 is a diagram illustrating an example of a correspondence relationship among a driving mode, a control state of an own vehicle, and a task.

DESCRIPTION OF EMBODIMENTS

Now, description is given of a vehicle control device, a vehicle control method, and a storage medium according to an embodiment of the present invention with reference to the drawings.

First Embodiment

[Overall Configuration]

Figure 1:
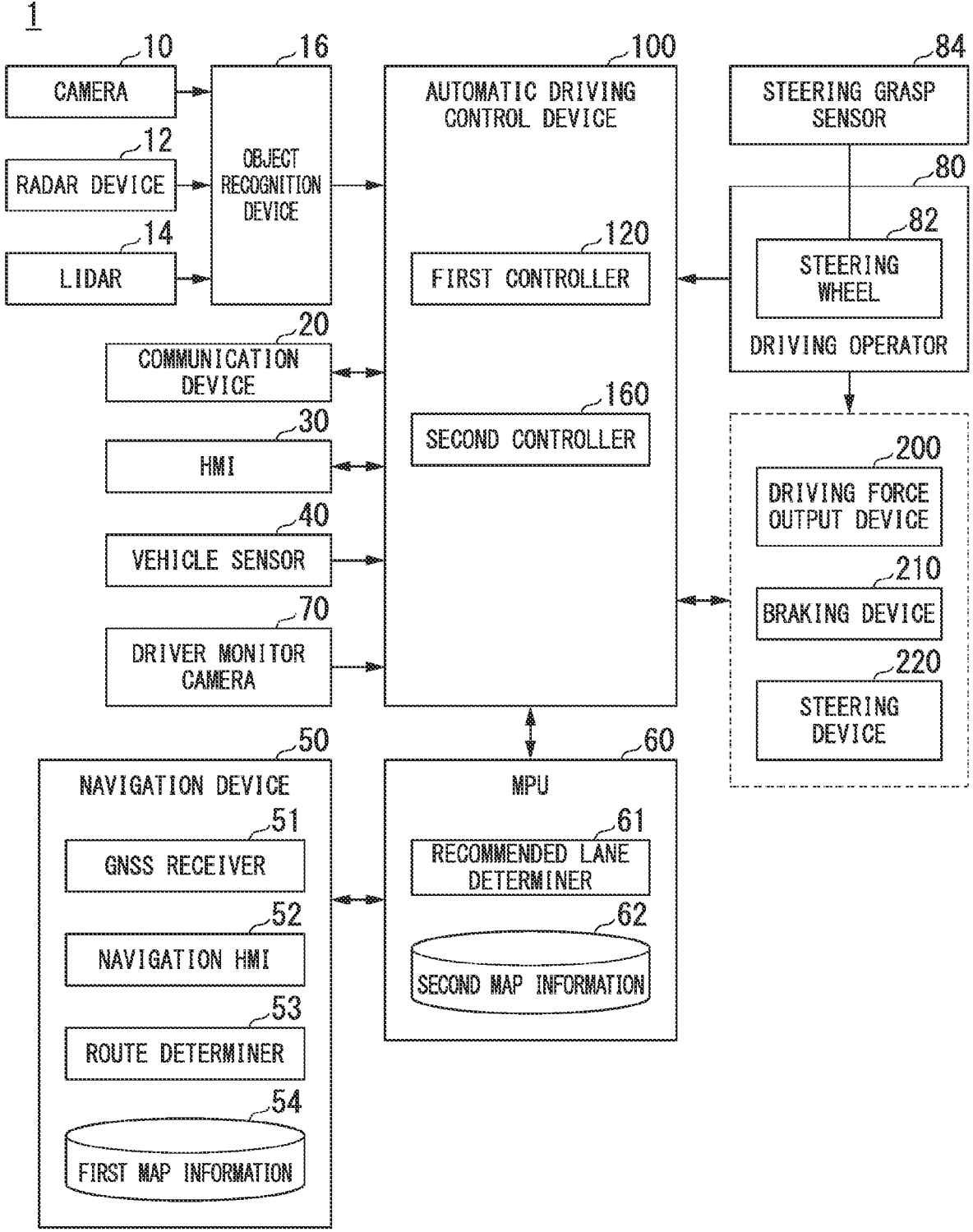
FIG. 1 is a configuration diagram of a vehicle system that uses a vehicle control device according to an embodiment.

FIG. 1 is a configuration diagram of a vehicle system 1 that uses a vehicle control device according to a first embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driving operator 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "own vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the own vehicle M periodically, for example. The camera 10 may be a stereo camera.

The radar device 12 radiates a radio wave such as a millimeter wave toward the surroundings of the own vehicle M, and detects a radio wave (reflected wave) reflected by an object, to detect at least the position (distance and direction) of the object. The radar device 12 is mounted on any part of the own vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the own vehicle M, and measures diffused light. The LIDAR 14 detects a distance to a target based on a period of time since emission of light until reception of light. The light to be radiated is, for example, pulsed laser light. The LIDAR 14 is mounted on any part of the own vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are. The object recognition device 16 may be omitted from the vehicle system 1.

The communication device 20 uses, for example, a cellular network, a Wi-Fi network, Bluetooth (trademark), or DSRC (Dedicated Short Range Communication) to communicate with another vehicle existing near the own vehicle M or communicate with various kinds of server devices via a radio base station.

The HMI 30 presents various kinds of information to an occupant of the own vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the own vehicle M, an acceleration sensor that detects an acceleration, a yaw rate sensor that detects an angular speed with respect to a vertical axis, and an orientation sensor that detects an orientation of the own vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the own vehicle M based on a signal received from a GNSS satellite. The position of the own vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determiner 53 refers to the first map information 54 to determine a route (hereinafter referred to as "map route") from the position (or any input position) of the own vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended route for each block with reference to the second map information 62. The recommended lane determiner 61 determines on which lane the own vehicle M is to travel. When there is a junction on a map route, the recommended lane determiner 61 determines a recommended route so that the own vehicle M can travel on a route for efficiently entering the junction.

The second map information 62 is map information having higher precision than that of the first map information 54. The second map information 62 includes, for example, information on the center of a lane or information on the boundary of a lane. The second map information 62 may include, for example, road information, traffic regulation information, address information (address or postal code), facility information, and phone number information. The second map information 62 may be updated appropriately through communication between the communication device 20 and another device.

A driver monitor camera 70 is, for example, a digital camera that uses a solid image pickup device such as a CCD or a CMOS. The driver monitor camera 70 is mounted on any part of the own vehicle M at a position and in a direction so as to be capable of picking up a front image of a head of an occupant (hereinafter referred to as "driver") sitting on a driver seat of the own vehicle M (in the direction of picking up an image of the face). For example, the driver monitor camera 70 is mounted on an upper part of a display device provided on the center of an instrumental panel of the own vehicle M.

The driving operator 80 includes, for example, an acceleration pedal, a brake pedal, a gear shift, and other operators in addition to the steering wheel 82. A sensor that detects an operation amount or whether an operation is applied is mounted on the driving operator 80, and the detection result is output to the automatic driving control device 100 or a part or all of the driving force output device 200, the braking device 210, and the steering device 220. The steering wheel 82 is an example of an "operator that receives a steering operation performed by a driver". The operator is not always required to have a ring shape, and may have other shapes for steering, or may be a joystick or a button. A steering grasp sensor 84 is attached to the steering wheel 82. The steering grasp sensor 84 is implemented by, for example, a capacitive sensor, and outputs, to the automatic driving control device 100, a signal that enables detection of whether or not the driver is grasping the steering wheel 82 (in contact with the steering wheel 82 so as to be able to apply a force).

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100. The automatic driving control device 100 is an example of "vehicle control device", and a combination of an action plan generator 140 and a second controller 160 is an example of "drive controller".

FIG. 2 is a functional configuration diagram of the first controller 120 and the second controller 160. The first controller 120 includes, for example, a recognizer 130, an action plan generator 140, and a mode determiner 150. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integral evaluation. In this manner, the reliability of automatic driving is assured.

The recognizer 130 recognizes states such as the position, speed, and acceleration of an object near the own vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the own vehicle M to be used for control. The position of an object may be represented by a representative point such as a center of gravity or corner of the object, or may be represented by a region. The "state" of an object may include the acceleration, jerk, or "action state" (for example, whether or not the own vehicle M is changing a lane or is trying to change a lane) of the object.

The recognizer 130 recognizes, for example, a lane (traveling lane) on which the own vehicle M is traveling. For example, the recognizer 130 recognizes the traveling lane by comparing a pattern (for example, arrangement of solid lines and broken lines) of a road division line obtained from the second map information 62 with a pattern of a road division line near the own vehicle M recognized from the image photographed by the camera 10, to thereby recognize the traveling lane. In addition to the road division line, the recognizer 130 may recognize the traveling lane by recognizing a traveling path boundary (road boundary) including, for example, a road division line, the shoulder of a road, a curb, a center median, and a guardrail. The traveling lane may be recognized in consideration of the position of the own vehicle M acquired from the navigation device 50 or the result of processing by the INS. The recognizer 130 recognizes a stop line, an obstacle, red light, a toll gate, and other road events.

The recognizer 130 recognizes the position or posture of the own vehicle M with respect to a traveling lane when recognizing the traveling lane. The recognizer 130 may recognize, for example, as the relative position and posture of the own vehicle M with respect to the traveling lane, a deviation of the reference point of the own vehicle M from the center of the lane and an angle with respect to a line obtained by connecting the centers of the lane in the traveling direction of the own vehicle M. Instead, the recognizer 130 may recognize, for example, the position of the reference point of the own vehicle M with respect to any side edge (road division line or road boundary) of the traveling lane as the relative position of the own vehicle M with respect to the traveling lane.

The action plan generator 140 travels on a recommended lane determined by the recommended lane determiner 61 in principle, and generates a target trajectory in which the own vehicle M is to travel in the future (irrespective of the operation of the driver) automatically so as to be capable of coping with the surroundings situation of the own vehicle M. The target trajectory includes, for example, a speed component. For example, the target trajectory is represented by arranging the locations (trajectory points) to be reached by the own vehicle M. The trajectory points are locations to be reached by the own vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the own vehicle M in each sampling period. In this case, information on the target speed and the target acceleration is represented by an interval between trajectory points. The action plan generator 140 is an example of "generator".

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event.

The mode determiner 150 determines a driving mode of the own vehicle M as any one of a plurality of driving modes having different tasks imposed on a driver. The mode determiner 150 includes, for example, a driver state determiner 152, a mode change processor 154, and a steering angular speed determiner 156. The functions of these components are described later.

FIG. 3 is a diagram illustrating an example of a correspondence relationship among a driving mode, a control state of the own vehicle M, and a task. The driving mode of the own vehicle M includes, for example, five modes, namely, a mode A to a mode E. The control state, namely, the degree of automatic driving control of the own vehicle M is the highest for the mode A, and the degree of automatic driving control decreases in order of the mode B, the mode C, the mode D, and the mode E. In contrast, the degree of a task imposed on a driver is the smallest for the mode A, and increases in order of the mode B, the mode C, the mode D, and the mode E. The mode D or the mode E is a control state that is not automatic driving, and thus the automatic driving control device 100 has a responsibility to finish control relating to automatic driving, and causes the driving mode to transition to driving assistance or manual driving. Now, examples of details of the respective driving modes are given in the following.

The mode A relates to the state of automatic driving, and the driver does not bear any one of the tasks of monitoring the front field of view and grasping the steering wheel 82. However, even in the mode A, the driver is required to have a posture of being able to immediately transition to manual driving in response to a request from a system, which is mainly the automatic driving control device 100. The automatic driving indicates that both of steering and acceleration/deceleration are controlled irrespective of an operation of the driver. The front field of view means a space in the traveling direction of the own vehicle M visually recognized through a front wind shield. The mode A is a driving mode that can be executed, for example, when the own vehicle M is traveling at a speed equal to or lower than the upper limit vehicle speed (for example, about 50 [km/h]) on an expressway such as a highway, and there is a preceding vehicle for the own vehicle M to follow, which is sometimes referred to as TJP (Traffic Jam Pilot). When this condition is not satisfied, the mode determiner 150 changes the driving mode of the own vehicle M to the mode B.

The mode B relates to the state of driving assistance, and the driver bears the task of monitoring the front field of view of the own vehicle M, but does not have the task of grasping the steering wheel 82. The mode C relates to the state of driving assistance, and the driver bears the task of monitoring the front field of view, and the task of grasping the steering wheel 82. The mode D is a driving mode in which the driver is required to perform a certain degree of operation for at least one of steering and acceleration/deceleration of the own vehicle M. For example, in the mode D, driving assistance such as ACC (Adaptive Cruise Control) or LKAS (Lane Keeping Assist System) is performed. The mode E refers to the state of manual driving in which the driver is required to perform a driving operation for both of steering and acceleration/deceleration. In both of the mode D and the mode E, the driver naturally bears the task of monitoring the front field of view of the own vehicle M.

The automatic driving control device 100 (and driving assistance device (not shown)) executes automatic lane change that depends on the driving mode. The automatic lane change includes an automatic lane change (1) required by the system and an automatic lane change (2) required by the driver. The automatic lane change (1) includes an automatic lane change for passing a preceding vehicle, which is performed when the vehicle speed of the preceding vehicle is lower than the vehicle speed of the own vehicle by a reference amount or more, and an automatic lane change (automatic lane change caused by change of recommended lane) for traveling toward the destination. The automatic lane change (2) is to change the lane of the own vehicle M toward an operation direction when the driver has operated a blinker in a case where, for example, a condition on the vehicle speed or a positional relationship with a nearby vehicle is satisfied.

In the mode A, the automatic driving control device 100 does not execute any one of the automatic lane change (1) and the automatic lane change (2). In the mode B and the mode C, the automatic driving control device 100 executes both of the automatic lane change (1) and the automatic lane change (2). In the mode D, the driving assistance device (not shown) does not execute the automatic lane change (1) but executes the automatic lane change (2). In the mode E, both of the automatic lane change (1) and the automatic lane change (2) are not executed.

When the task of the determined driving mode (hereinafter referred to as "current driving mode") is not performed by the driver, the mode determiner 150 changes the driving mode of the own vehicle M to a driving mode that imposes a heavier task.

For example, when the driver is in a posture of not being able to transition to manual driving in response to a request from the system in the mode A (for example, when the driver is continuously looking aside or when a sign that indicates a difficulty in driving is detected), the mode determiner 150 uses the HMI 30 to prompt the driver to transition to manual driving, and when the driver does not respond, the mode determiner 150 performs control of causing the own vehicle M to gradually stop at the shoulder of the road and stopping automatic driving. After automatic driving is stopped, the own vehicle M is set to the state of the mode D or the mode E, and the own vehicle M can be caused to start by a manual operation performed by the driver. The following description holds true for the case of "stopping automatic driving". When the driver is not monitoring the front field of view in the mode B, the mode determiner 150 uses the HMI 30 to prompt the driver to monitor the front field of view, and when the driver does not respond, the mode determiner 150 performs control of causing the own vehicle M to gradually stop at the shoulder of the road and stopping automatic driving. When the driver is not monitoring the front field of view or is not grasping the steering wheel 82 in the mode C, the mode determiner 150 uses the HMI 30 to prompt the driver to monitor the front field of view and/or to grasp the steering wheel 82, and when the driver does not respond, the mode determiner 150 performs control of causing the own vehicle M to gradually stop at the shoulder of the road and stopping automatic driving.

The driver state determiner 152 monitors the state of the driver and determines whether the state of the driver is a state that depends on a task in order to perform the mode change described above. For example, the driver state determiner 152 analyzes an image photographed by the driver monitor camera 70 to perform posture estimation processing, and determines whether the driver is in a posture of not being able to transition to manual driving in response to a request from the system. The driver state determiner 152 analyzes the image photographed by the driver monitor camera 70 to perform line-of-sight estimation processing, and determines whether or not the driver is monitoring the front field of view.

The mode change processor 154 performs various kinds of processing for changing the mode. For example, the mode change processor 154 gives an instruction to generate a target trajectory for causing the action plan generator 140 to stop at the shoulder, gives an activation instruction to the driving assistance device (not shown), or controls the HMI 30 to cause the driver to perform an action.

The function of the steering angular speed determiner 156 is described later.

The second controller 160 controls the driving force output device 200, the braking device 210, and the steering device 220 so that the own vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control. As an example, the steering controller 166 executes feed-forward control that depends on the curvature of the road in front of the own vehicle M and feedback control based on a deviation from the target trajectory. Furthermore, the steering controller 166 uses, for example, the degree of curvature of the target trajectory stored in the memory, a speed component accompanying the target trajectory stored in the memory, and specification information such as the wheelbase or suspension characteristic of the own vehicle M to calculate a target steering angle $\theta$, and transmits the target steering angle $\theta$ to the mode determiner 150.

The driving force output device 200 outputs, to a drive wheel, a traveling driving force (torque) for causing the own vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving operator 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving operator 80, and causes a brake torque that depends on a braking operation to be output to each wheel. The braking device 210 may include, as a backup, a mechanism for transmitting the hydraulic pressure, which is caused by an operation of the brake pedal included in the driving operator 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving operator 80 to change the orientation of the steered wheel.

[Control that Depends on Steering Speed]

Now, details of control for finishing the mode A or the mode B depending on the steering speed, which is executed by the mode determiner 150, are described with reference to FIG. 4 and FIG. 5.

The steering angular speed determiner 156 of the mode determiner 150 acquires a target steering angle $\theta$ for following the target trajectory of the own vehicle M from the steering controller 166, and determines whether a change $d\theta/dt1$ in speed of the target steering angle $\theta$ in a first period $dt1$ of the target steering angle $\theta$ is equal to or larger than a first threshold value, and determines whether a change $d\theta/dt2$ in speed of the target steering angle $\theta$ in a second period $dt2$ of the target steering angle $\theta$ is equal to or larger than a second threshold value. In this embodiment, the first period $dt1$ is a period longer than the second period $dt2$. For example, the first period $dt1$ is set to one second, and the second period $dt2$ is set to 0.5 seconds. The change in speed acquired at this time is an average change speed of the target steering angle $\theta$ measured in the first period $dt1$ or the second period $dt2$. In general, the change $d\theta/dt1$ in speed in the first period $dt1$ tends to be shorter than the change $d\theta/dt2$ in speed in the second period $dt2$, and thus the steering angular speed determiner 156 sets the first threshold value to a value smaller than the second threshold value. When the driving mode of the own vehicle M is the mode A or the mode B and the steering angular speed determiner 156 has determined that the change $d\theta/dt1$ in speed of the target steering angle $\theta$ in the first period $dt1$ is equal to or larger than the first threshold value or the change $d\theta/dt2$ in speed of the target steering angle $\theta$ in the second period $dt2$ is equal to or larger than the second threshold value, the mode change processor 154 changes the driving mode to the mode C, the mode D, or the mode E. In this embodiment, the mode change processor 154 changes the mode when OR condition is satisfied for determination of the first threshold value and determination of the second threshold value. However, the mode change processor 154 may change the mode when AND condition is satisfied for determination of the first threshold value and determination of the second threshold value. The mode A or the mode B is an example of "second driving mode", and the mode C, the mode D, or the mode E is an example of "first driving mode".

Figure 4:
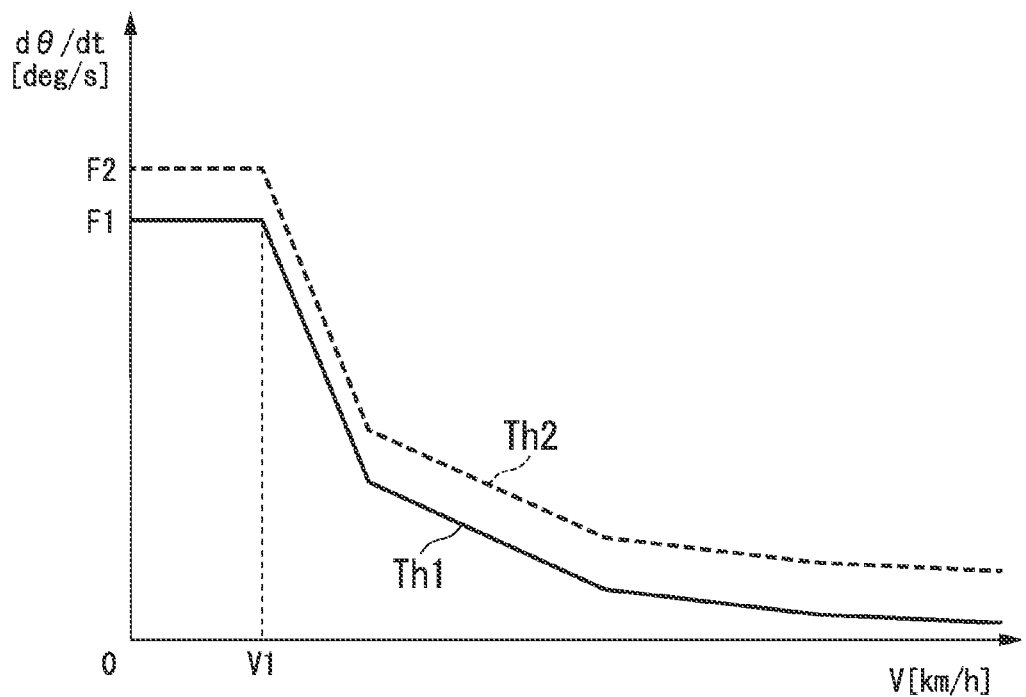
FIG. 4 is a diagram illustrating a relationship between a vehicle speed and a threshold value for a steering speed at the time of a steering-forward operation.

FIG. 4 is a diagram illustrating a relationship between a vehicle speed V and threshold values Th1 and Th2 for the steering speed $d\theta/dt$ at the time of a steering-forward (increase) operation. The change $d\theta/dt1$ in speed and the change $d\theta/dt2$ in speed are collectively referred to as "steering speed $d\theta/dt$". The "steering-forward operation" means a state in which the steering speed $d\theta/dt$ takes a positive value. The action plan generator 140 generates the vehicle speed V, and transmits the generated vehicle speed V to the mode determiner 150. In FIG. 4, the solid line indicates the threshold value Th1 (example of "first threshold value") for the change $d\theta/dt1$ in speed of the target steering angle $\theta$ in the first period $dt1$, and the broken line indicates the threshold value Th2 (example of "second threshold value") for the change $d\theta/dt2$ in speed of the target steering angle $\theta$ in the second period $dt2$.

As illustrated in FIG. 4, the steering angular speed determiner 156 sets the threshold value Th1 to a defined value F1 when the vehicle speed V falls within a range of from zero to a reference vehicle speed V1. The defined value F1 is a maximum value of the threshold value Th1. Similarly, the steering angular speed determiner 156 sets the threshold value Th2 to a defined value F2 when the vehicle speed V falls within a range of from zero to the reference vehicle speed V1. The defined value F2 is a maximum value of the threshold value Th2. This is because when the vehicle speed V is equal to or higher than zero and equal to or lower than the reference vehicle speed V1, that is, when the vehicle speed V is in a low-speed state, execution of steering at a higher steering speed dθ/dt is less dangerous for the user, and it is considered that an abnormality in steering has not occurred. In other words, it is considered that as the vehicle speed V generated by the action plan generator 140 becomes higher, steering is more dangerous for the user, and the steering angular speed determiner 156 sets the threshold value Th1 and the threshold value Th2 for determining an abnormality in steering smaller.

Figure 5:
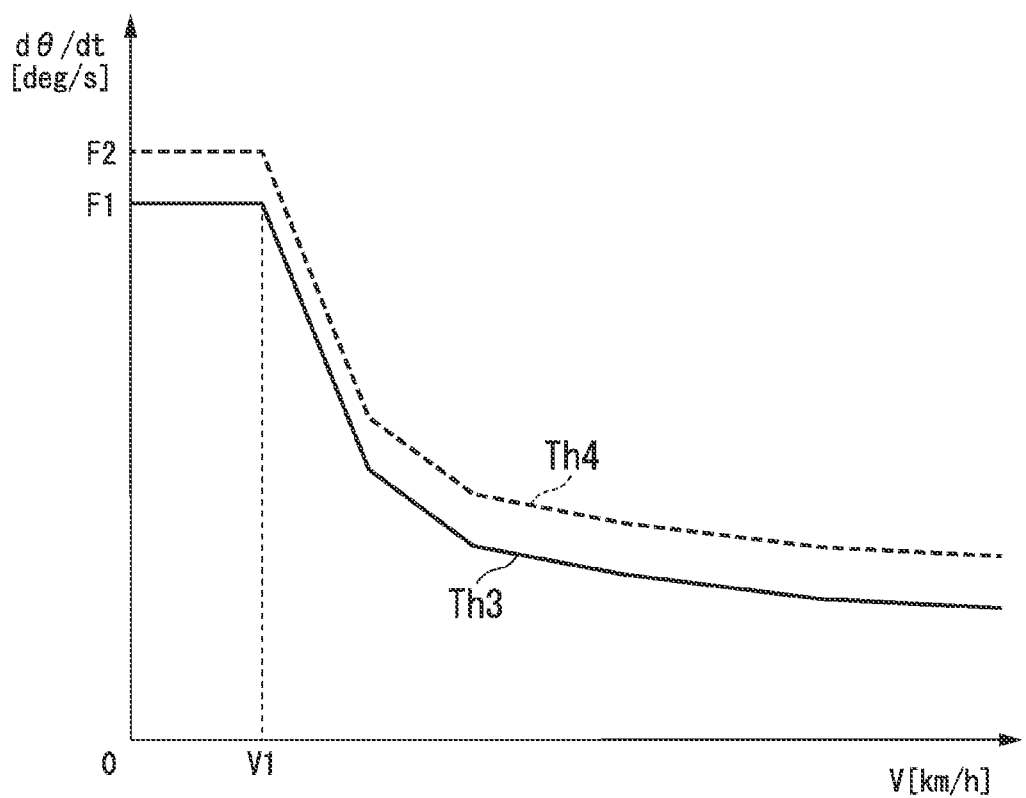
FIG. 5 is a diagram illustrating a relationship between the vehicle speed and the threshold value for the steering speed at the time of a steering backward operation.

FIG. 5 is a diagram illustrating a relationship between the vehicle speed V and threshold values Th3 and Th4 for the steering speed dθ/dt at the time of a steering backward (reverse) operation. The "steering backward operation" means a state in which the steering speed dθ/dt takes a negative value. In FIG. 5, the solid line indicates the threshold value Th3 (another example of "first threshold value") for the change dθ/dt1 in speed of the target steering angle θ in the first period dt1, and the broken line indicates the threshold value Th4 (another example of "second threshold value") for the change dθ/dt2 in speed of the target steering angle θ in the second period dt2. A magnitude relationship between the threshold value Th3 and the threshold value Th4, and such a tendency that the threshold value Th3 and the threshold value Th4 are set smaller as the vehicle speed V becomes higher are similar to the threshold value Th1 and the threshold value Th2 of FIG. 4.

On the other hand, in FIG. 5, the steering angular speed determiner 156 sets the threshold value Th3 larger than the threshold value Th1, that is, sets the first threshold value larger, and sets the threshold value Th4 larger than the threshold value Th2, that is, sets the second threshold value larger. This is because when the steering direction of the own vehicle M is a steering-backward direction, the own vehicle M moves back to the original path in many cases, and thus execution of steering at a higher steering speed dθ/dt is less dangerous for the user, and it is considered that an abnormality in steering has not occurred. In short, it is possible to flexibly set the threshold value for determining an abnormality in steering depending on the magnitude of the vehicle speed V or the steering direction.

In FIG. 4 and FIG. 5, the steering angular speed determiner 156 decreases various kinds of threshold values in the form of a polyline in response to increase in the vehicle speed V. However, the manner of decreasing the threshold value is not limited thereto, and the threshold value may be decreased in any manner as long as the threshold value decreases in response to increase in the vehicle speed V, such as a linear form, curve form, or a step form. Furthermore, the threshold value Th3 is set larger than the threshold value Th1, and the threshold value Th4 is set larger than the threshold value Th2, but both of the values may be the same in a low-speed vehicle speed region where the vehicle speed V does not reach V1. This is because in a low-speed vehicle speed region, a steering forward operation is also less dangerous for the user similarly to a steering backward operation, and it is considered that an abnormality in steering has not occurred.

Figure 6:
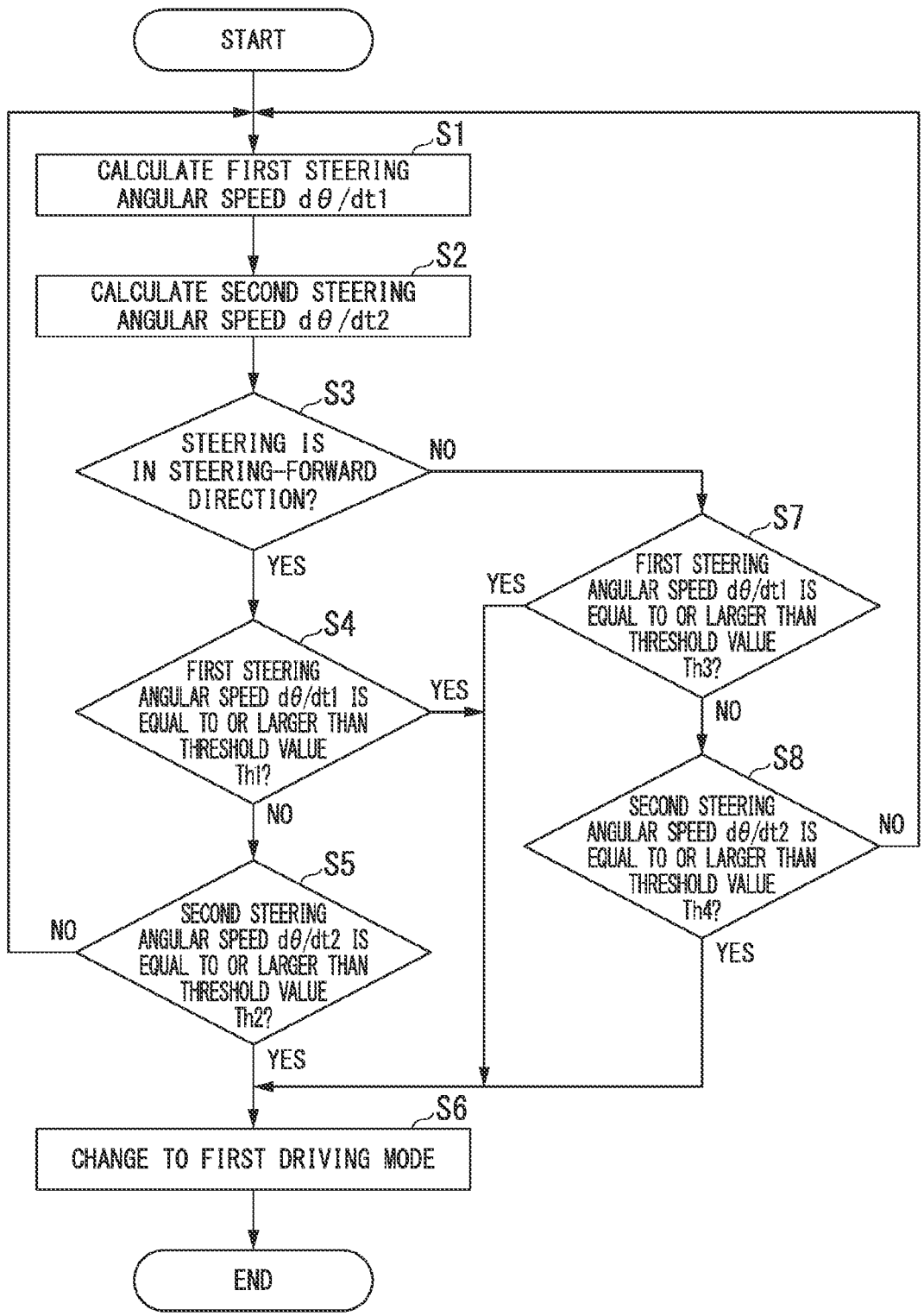
FIG. 6 is a flow chart illustrating an example of the processing of changing the driving mode to be executed by a mode determiner.

Next, the processing of changing the driving mode to be executed by the mode determiner 150 is described with reference to FIG. 6. FIG. 6 is a flow chart illustrating an example of the processing of changing the driving mode to be executed by the mode determiner 150. The processing of the flow chart is started when the own vehicle M starts to travel in the second driving mode.

First, the mode determiner 150 acquires the target steering angle θ from the steering controller 166 in the first period dt1, and calculates a first steering angular speed dθ/dt1, which is a change in speed of the target steering angle θ in the first period dt1 (S1). Next, the mode determiner 150 acquires the target steering angle θ from the steering controller 166 in the second period dt2, and calculates a second steering angular speed dθ/dt2, which is a change in speed of the target steering angle θ in the second period dt2 (S2). For the sake of convenience of description, the processing of S1 and the processing of S2 are executed in series, but may be executed in parallel.

Next, the mode determiner 150 determines whether or not the steering direction is a steering-forward direction based on the first steering angular speed dθ/dt1 or the second steering angular speed dθ/dt2 (S3). Specifically, the mode determiner 150 determines that the steering direction is a steering-forward direction when the first steering angular speed dθ/dt1 or the second steering angular speed dθ/dt2 takes a positive value. In this step, the signs of dθ/dt1 and dθ/dt2 may be different from each other, and a steering-forward direction may not be defined in that case. However, in such a case, a steering operation is not performed greatly at a high speed, and thus the processing of from S4 to S8 may be skipped to return to the processing of S1.

When the mode determiner 150 has determined that the steering direction is a steering-forward direction, the mode determiner 150 determines whether or not the first steering angular speed dθ/dt1 is equal to or larger than the threshold value Th1 (S4). When the mode determiner 150 has determined that the first steering angular speed dθ/dt1 is equal to or larger than the threshold value Th1, the mode determiner 150 changes the driving mode from the second driving mode to the first driving mode, and finishes the processing (S6). On the other hand, when the mode determiner 150 has determined that the first steering angular speed dθ/dt1 is not equal to or larger than the threshold value Th1, the mode determiner 150 determines whether or not the second steering angular speed dθ/dt2 is equal to or larger than the threshold value Th2 (S5). When the mode determiner 150 has determined that the second steering angular speed dθ/dt2 is equal to or larger than the threshold value Th2, the mode determiner 150 changes the driving mode from the second driving mode to the first driving mode (S8). On the other hand, when the mode determiner 150 has determined that the second steering angular speed dθ/dt2 is not equal to or larger than the threshold value Th2, the mode determiner 150 returns the processing to S1 again.

When the mode determiner 150 has determined that the steering direction is not a steering-forward direction, the mode determiner 150 determines whether the first steering angular speed dθ/dt1 is equal to or larger than the threshold value Th3 (S7). When the mode determiner 150 has determined that the first steering angular speed dθ/dt1 is equal to or larger than the threshold value Th3, the mode determiner 150 changes the driving mode from the second driving mode to the first driving mode, and finishes the processing (S6). On the other hand, when the mode determiner 150 has determined that the first steering angular speed dθ/dt1 is not equal to or larger than the threshold value Th3, the mode determiner 150 determines whether or not the second steering angular speed dθ/dt2 is equal to or larger than the threshold value Th4 (S8). When the mode determiner 150 has determined that the second steering angular speed $d\theta/dt2$ is equal to or larger than the threshold value Th4, the mode determiner 150 changes the driving mode from the second driving mode to the first driving mode (S8). On the other hand, when the mode determiner 150 has determined that the second steering angular speed $d\theta/dt2$ is not equal to or larger than the threshold value Th4, the mode determiner 150 returns the processing to S1 again.

Through the processing described above, the mode determiner 150 compares the first steering angular speed $d\theta/dt1$ with the first threshold value, and compares the second steering angular speed $d\theta/dt2$ with the second threshold value. Then, when the first steering angular speed $d\theta/dt1$ is equal to or larger than the first threshold value or the second steering angular speed $d\theta/dt2$ is equal to or larger than the second threshold value, the mode determiner 150 determines an abnormality in steering and changes the driving mode. As a result, it is possible to determine an abnormality in steering exhaustively and reliably.

Second Embodiment

Figure 7:
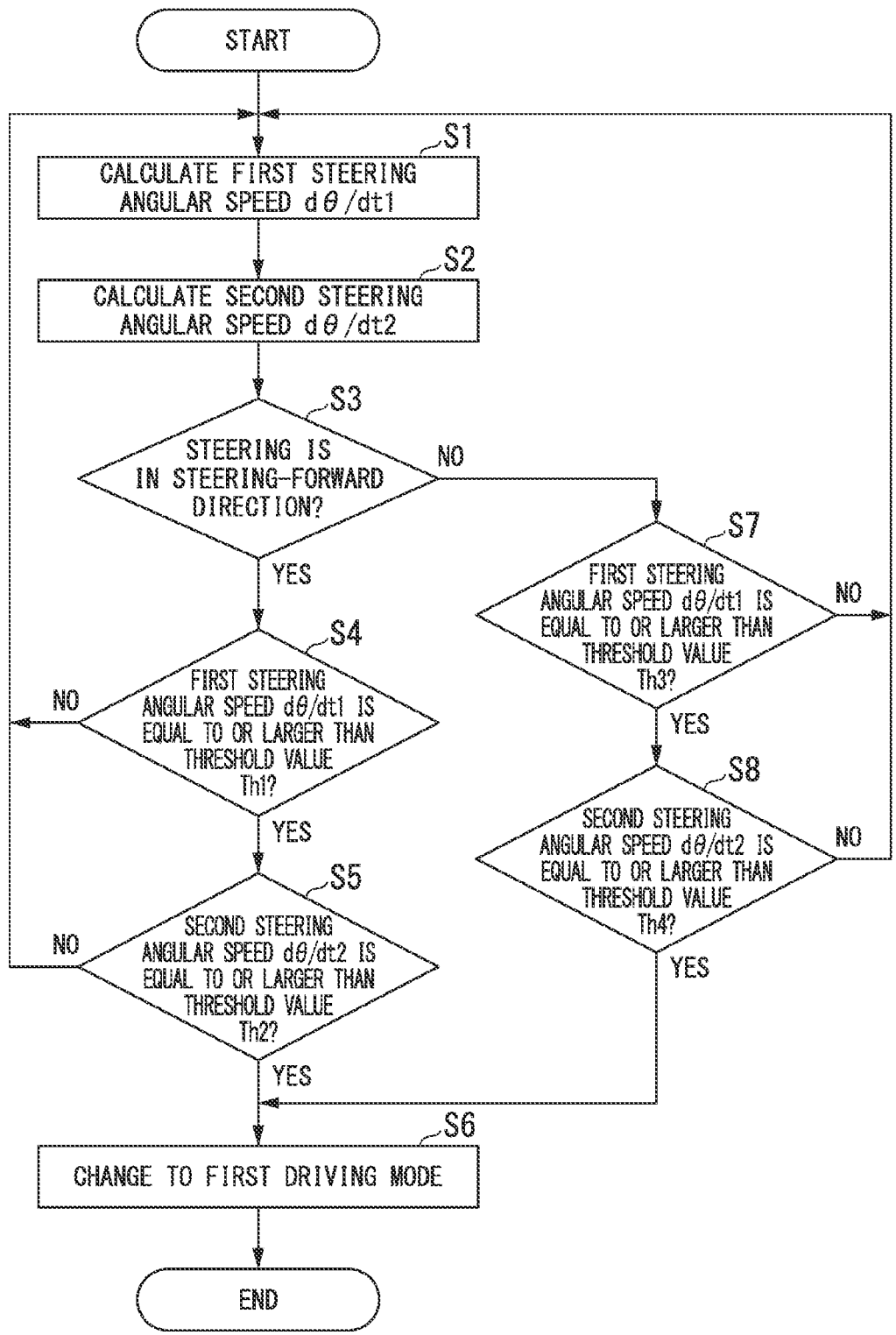
FIG. 7 is a flow chart illustrating another example of the processing of changing the driving mode to be executed by the mode determiner.

Next, another example of the processing of changing the driving mode to be executed by the mode determiner 150 is described with reference to FIG. 7. FIG. 7 is a flow chart illustrating another example of the processing of changing the driving mode to be executed by the mode determiner 150. In FIG. 7, the processing of from S1 to S3 is similar to that of FIG. 6, and description thereof is omitted here.

In S3, when the mode determiner 150 has determined that the steering direction is a steering-forward direction, the mode determiner 150 determines whether or not the first steering angular speed $d\theta/dt1$ is equal to or larger than the threshold value Th1 (S4). When the mode determiner 150 has determined that the first steering angular speed $d\theta/dt1$ is equal to or larger than the threshold value Th1, the mode determiner 150 determines whether or not the second steering angular speed $d\theta/dt2$ is equal to or larger than the threshold value Th2 (S5). On the other hand, when the mode determiner 150 has determined that the first steering angular speed $d\theta/dt1$ is equal to or larger than the threshold value Th1, the mode determiner 150 determines whether or not the second steering angular speed $d\theta/dt2$ is equal to or larger than the threshold value Th2 (S5). On the other hand, when the mode determiner 150 has determined that the first steering angular speed $d\theta/dt1$ is not equal to or larger than the threshold value Th1, the mode determiner 150 returns the processing to S1 again. When the mode determiner 150 has determined that the second steering angular speed $d\theta/dt2$ is equal to or larger than the threshold value Th2, the mode determiner 150 changes the driving mode from the second driving mode to the first driving mode (S6). On the other hand, when the mode determiner 150 has determined that the second steering angular speed $d\theta/dt2$ is not equal to or larger than the threshold value Th2, the mode determiner 150 returns the processing to S1 again.

In S3, when the mode determiner 150 has determined that the steering direction is not a steering-forward direction, the mode determiner 150 determines whether or not the first steering angular speed $d\theta/dt1$ is equal to or larger than the threshold value Th3 (S7). When the mode determiner 150 has determined that the first steering angular speed $d\theta/dt1$ is equal to or larger than the threshold value Th3, the mode determiner 150 determines whether or not the second steering angular speed $d\theta/dt2$ is equal to or larger than the threshold value Th4 (S8). On the other hand, when the mode determiner 150 has determined that the first steering angular speed $d\theta/dt1$ is not equal to or larger than the threshold value Th3, the mode determiner 150 returns the processing to S1 again. When the mode determiner 150 has determined that the second steering angular speed $d\theta/dt2$ is equal to or larger than the threshold value Th4, the mode determiner 150 changes the driving mode from the second driving mode to the first driving mode (S6). On the other hand, when the mode determiner 150 has determined that the second steering angular speed $d\theta/dt2$ is not equal to or larger than the threshold value Th4, the mode determiner 150 returns the processing to S1 again.

According to the second embodiment described above, contrary to the first embodiment, when the first steering angular speed $d\theta/dt1$ is equal to or larger than the first threshold value and the second steering angular speed $d\theta/dt2$ is equal to or larger than the second threshold value, the mode determiner 150 determines an abnormality in steering, and changes the driving mode. As a result, it is possible to prevent erroneous determination by the mode determiner 150.

The mode for carrying out the present invention has been described, but the present invention is not limited to such embodiments, and various kinds of modifications and replacements can be made within the range that does not depart from the gist of the present invention.

What is claimed is:

1. A vehicle control device, comprising: one or more storage devices storing a program; and one or more hardware processors, the one or more hardware processors being configured to execute the program stored in the one or more storage devices to:
generate a target trajectory of a vehicle;
determine whether or not a change in speed of a target steering angle for following the target trajectory in a first period is equal to or larger than a first threshold value and whether or not a change in speed of the target steering angle in a second period is equal to or larger than a second threshold value; and
determine a driving mode of the vehicle as any one of a plurality of driving modes including a first driving mode and a second driving mode that imposes a simpler task on a driver than the first driving mode,
wherein the one or more hardware processors are configured to change, in a case where the driving mode of the vehicle is the second driving mode, the driving mode of the vehicle to the first driving mode when the change in speed of the target steering angle in the first period is determined to be equal to or larger than the first threshold value or when the change in speed of the target steering angle in the second period is determined to be equal to or larger than the second threshold value,
wherein the first period is a period longer than the second period, and
wherein the first threshold value is a value smaller than the second threshold value.

2. The vehicle control device according to claim 1, wherein the one or more hardware processors are configured to set the first threshold value or the second threshold value smaller as a vehicle speed of the vehicle becomes higher.

3. The vehicle control device according to claim 1, wherein the one or more hardware processors are configured to set the first threshold value or the second threshold value to a predetermined value when a vehicle speed of the vehicle falls within a range of from zero to a reference vehicle speed.

4. The vehicle control device according to claim 3,
wherein the second driving mode includes a driving mode that does not impose any one of a task of monitoring a front field of the vehicle and a task of grasping a steering wheel of the vehicle and in which an upper limit vehicle speed is set for the vehicle, and
wherein the reference vehicle speed is the upper limit vehicle speed.

5. The vehicle control device according to claim 1, wherein the one or more hardware processors are configured to set the first threshold value or the second threshold value larger when a steering direction of the vehicle is a steering-backward direction than when the steering direction is a steering-forward direction.

6. A vehicle control device, comprising: one or more storage devices storing a program; and one or more hardware processors, the one or more hardware processors being configured to execute the program stored in the one or more storage devices to:
acquire a target steering angle for following a target trajectory of a vehicle;
determine whether or not a change in speed of the target steering angle in a first period is equal to or larger than a first threshold value and whether or not a change in speed of the target steering angle in a second period is equal to or larger than a second threshold value; and
determine a driving mode of the vehicle as any one of a plurality of driving modes including a first driving mode and a second driving mode that imposes a simpler task on a driver than the first driving mode,
wherein the one or more hardware processors are configured to change, in a case where the driving mode of the vehicle is the second driving mode, the driving mode of the vehicle to the first driving mode when the change in speed of the target steering angle in the first period is determined to be equal to or larger than the first threshold value and the change in speed of the target steering angle in the second period is determined to be equal to or larger than the second threshold value,
wherein the first period is a period longer than the second period, and
wherein the first threshold value is a value smaller than the second threshold value.

7. A vehicle control method to be executed by a vehicle control device, the vehicle control method comprising:
acquiring a target steering angle for following a target trajectory of a vehicle;
determining whether or not a change in speed of the target steering angle in a first period is equal to or larger than a first threshold value and whether or not a change in speed of the target steering angle in a second period is equal to or larger than a second threshold value;
determining a driving mode of the vehicle as any one of a plurality of driving modes including a first driving mode and a second driving mode that imposes a simpler task on a driver than the first driving mode; and
changing, in a case where the driving mode of the vehicle is the second driving mode, the driving mode of the vehicle to the first driving mode when the change in speed of the target steering angle in the first period is determined to be equal to or larger than the first threshold value or when the change in speed of the target steering angle in the second period is determined to be equal to or larger than the second threshold value,
wherein the first period is a period longer than the second period, and
wherein the first threshold value is a value smaller than the second threshold value.

8. A vehicle control method to be executed by a vehicle control device, the vehicle control method comprising:
acquiring a target steering angle for following a target trajectory of a vehicle;
determining whether or not a change in speed of the target steering angle in a first period is equal to or larger than a first threshold value and whether or not a change in speed of the target steering angle in a second period is equal to or larger than a second threshold value;
determining a driving mode of the vehicle as any one of a plurality of driving modes including a first driving mode and a second driving mode that imposes a simpler task on a driver than the first driving mode; and
changing, in a case where the driving mode of the vehicle is the second driving mode, the driving mode of the vehicle to the first driving mode when the change in speed of the target steering angle in the first period is determined to be equal to or larger than the first threshold value and the change in speed of the target steering angle in the second period is determined to be equal to or larger than the second threshold value,
wherein the first period is a period longer than the second period, and
wherein the first threshold value is a value smaller than the second threshold value.

9. A computer-readable non-transitory storage medium having stored thereon a program for causing a processor of a vehicle control device to:
acquire a target steering angle for following a target trajectory of a vehicle;
determine whether or not a change in speed of the target steering angle in a first period is equal to or larger than a first threshold value and whether or not a change in speed of the target steering angle in a second period is equal to or larger than a second threshold value;
determine a driving mode of the vehicle as any one of a plurality of driving modes including a first driving mode and a second driving mode that imposes a simpler task on a driver than the first driving mode; and
change, in a case where the driving mode of the vehicle is the second driving mode, the driving mode of the vehicle to the first driving mode when the change in speed of the target steering angle in the first period is determined to be equal to or larger than the first threshold value or when the change in speed of the target steering angle in the second period is determined to be equal to or larger than the second threshold value,
wherein the first period is a period longer than the second period, and
wherein the first threshold value is a value smaller than the second threshold value.

10. A computer-readable non-transitory storage medium having stored thereon a program for causing a processor of a vehicle control device to:
acquire a target steering angle for following a target trajectory of a vehicle;
determine whether or not a change in speed of the target steering angle in a first period is equal to or larger than a first threshold value and whether or not a change in speed of the target steering angle in a second period is equal to or larger than a second threshold value;
determine a driving mode of the vehicle as any one of a plurality of driving modes including a first driving mode and a second driving mode that imposes a simpler task on a driver than the first driving mode; and change, in a case where the driving mode of the vehicle is the second driving mode, the driving mode of the vehicle to the first driving mode when the change in speed of the target steering angle in the first period is determined to be equal to or larger than the first threshold value and the change in speed of the target steering angle in the second period is determined to be equal to or larger than the second threshold value, wherein the first period is a period longer than the second period, and wherein the first threshold value is a value smaller than the second threshold value.

\* \* \* \* \*